(12) United States Patent
Birau et al.

(10) Patent No.: US 8,741,041 B2
(45) Date of Patent: Jun. 3, 2014

(54) PHASE CHANGE INK COMPOSITIONS CONTAINING LIGNOSULFONATE COMPOUNDS

(75) Inventors: Mihaela Maria Birau, Mississauga (CA); C. Geoffrey Allen, Waterdown (CA); Salma Falah Toosi, Mississauga (CA); Biby Esther Abraham, Mississauga (CA); Peter G. Odell, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 103 days.

(21) Appl. No.: 13/565,920

(22) Filed: Aug. 3, 2012

(65) Prior Publication Data

US 2014/0035994 A1  Feb. 6, 2014

(51) Int. Cl.
*C09D 11/02* (2006.01)

(52) U.S. Cl.
USPC ..................... 106/31.29; 106/31.61

(58) Field of Classification Search
CPC ...................................................... C09D 11/34
USPC ........................................... 106/31.29, 31.61
See application file for complete search history.

(56) References Cited

U.S. PATENT DOCUMENTS

| | | | |
|---|---|---|---|
| 4,177,313 | A | 12/1979 | Herault |
| 5,811,385 | A | 9/1998 | Eyrisch et al. |
| 5,880,299 | A | 3/1999 | Obiols et al. |
| 5,972,047 | A | 10/1999 | Dilling et al. |
| 5,989,299 | A | 11/1999 | Dilling et al. |
| 6,309,453 | B1 | 10/2001 | Banning et al. |
| 6,435,277 | B1 | 8/2002 | Qu et al. |
| 6,860,930 | B2 | 3/2005 | Wu et al. |
| 7,407,539 | B2 | 8/2008 | Wu et al. |
| 7,973,186 | B1 | 7/2011 | Goredema et al. |
| 2008/0308004 | A1 | 12/2008 | Deroover et al. |
| 2012/0180694 | A1 | 7/2012 | Birau et al. |

OTHER PUBLICATIONS

U.S. Patent Application filed Aug. 3, 2012, of Mihaela Maria Birau et al., entitled "Lignosulfonate Compounds for Solid Ink Applications," 34 pages, U.S. Appl. No. 13/565,944, not yet published.
Yifu et al., "Effect of Quaternary Ammonium Ions on Properties of Water-Reducing Agent of Lignosulfonate," Chemical Research, vol. 11, No. 2, Jun. 2000, pp. 33-36, Abstract in English.

*Primary Examiner* — Veronica F Faison
(74) *Attorney, Agent, or Firm* — Marylou J. Lavoie

(57) ABSTRACT

A phase change ink composition includes a carrier; an optional colorant; and a lignosulfonate compound of the formula

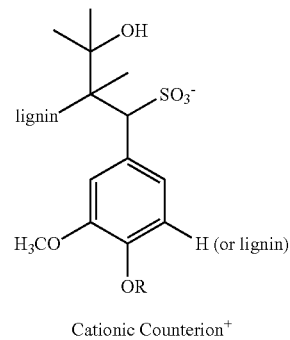

Cationic Counterion[+]

wherein R is hydrogen or

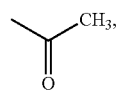

and wherein the cationic counterion[+] is a nitrogen-alkyl cationic counterion, a nitrogen-aryl cationic counterion, a nitrogen-alkylaryl cationic counterion, or a nitrogen arylalkyl cationic counterion; and wherein the cationic counterion contains at least eight carbon atoms.

20 Claims, 1 Drawing Sheet

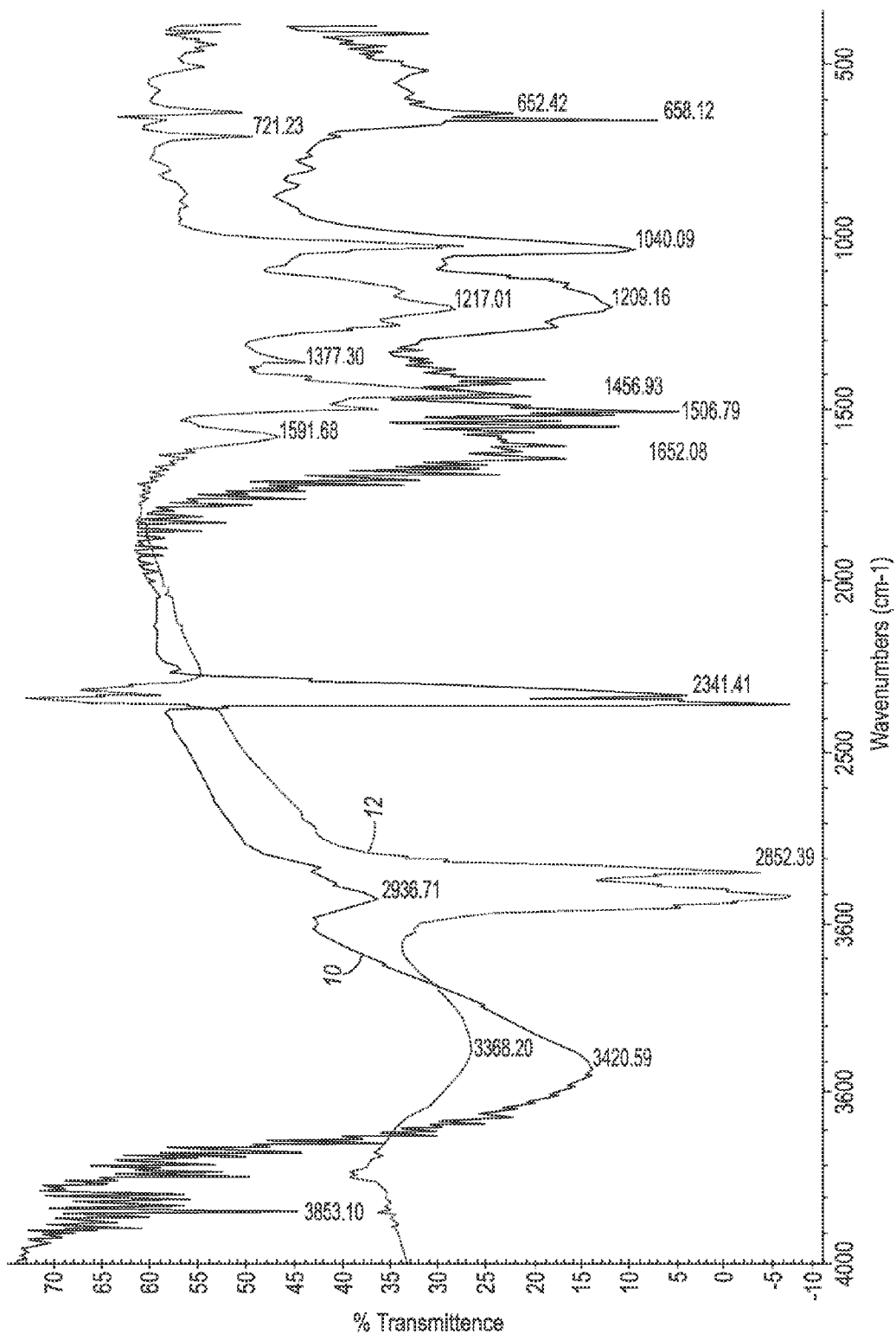

PHASE CHANGE INK COMPOSITIONS CONTAINING LIGNOSULFONATE COMPOUNDS

TECHNICAL FIELD

Described herein are phase change ink compositions containing lignosulfonate compounds. More particularly, described herein are phase change ink compositions containing modified lignosulfonate compounds that may be used in a number of copying and printing devices.

RELATED APPLICATIONS

Commonly assigned U.S. patent application Ser. No. 13/565,944, entitled "Lignosulfonate Compounds For Solid Ink Applications"), filed concurrently herewith, which is hereby incorporated by reference herein in its entirety, describes a lignosulfonate compound used to improve solid ink face plate drooling and fouling performance.

BACKGROUND

Phase change ink or solid ink compositions are characterized by being solid at room temperature and molten at an elevated temperature at which the molten ink is applied to a substrate. Phase change ink compositions generally comprise an ink vehicle and a colorant, and can be used for ink jet printing.

Phase change ink or solid ink printers conventionally receive ink in a solid form, sometimes in the form of ink sticks. The ink sticks are typically inserted through an insertion opening of an ink loader for the printer and are moved by a feed mechanism and/or gravity toward a heater plate. The heater plate melts the phase change ink impinging on the plate into a liquid that is delivered to a print head assembly for jetting onto a recording medium. The recording medium is typically paper or a liquid layer supported by an intermediate imaging member, such as a metal drum or belt.

A print head assembly of a phase change ink printer typically includes one or more print heads each having a plurality of ink jets from which drops of melted phase change ink are ejected towards the recording medium. The ink jets of a print head receive the melted ink from an ink supply chamber, or manifold, in the print head which, in turn, receives ink from a source, such as a melted ink reservoir or an ink cartridge. Each ink jet includes a channel having one end connected to the ink supply manifold. The other end of the ink channel has an orifice, or nozzle, for ejecting drops of ink. The nozzles of the ink jets may be formed in an aperture, or nozzle plate that has openings corresponding to the nozzles of the ink jets. During operation, drop ejecting signals activate actuators in the ink jets to expel drops of fluid from the ink jet nozzles onto the recording medium. By selectively activating the actuators of the ink jets to eject drops as the recording medium and/or print head assembly are moved relative to each other, the deposited drops can be precisely patterned to form particular text and graphic images on the recording medium.

Solid inks containing organic pigments and dyes or a pigment/dispersant package can show poor drooling behavior and unacceptable face plate staining on the ink jet print head. Attempts to improve drooling performance in solid inks have included changing pigments, changing dispersants, and using various synergists with the pigment to enable dispersion stabilization. Compounds available off the shelf to address this drooling and staining problem have shown an undesirably strong gelling behavior in solid ink. Certain acidic compounds, such as sodium dodecylbenzene sulfonic acid (DDBSA), have been incorporated into pigmented inks but did not improve drool performance.

There remains a need for improved phase change ink compositions that can provide improved drooling and staining characteristics. There further remains a need for green or bio-renewable additives for pigmented solid ink compositions that can provide improved face plate drooling and staining characteristics.

The appropriate components and process aspects of the each of the foregoing U.S. Patents and Patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is a phase change ink composition comprising a carrier; an optional colorant; and a lignosulfonate compound of the formula:

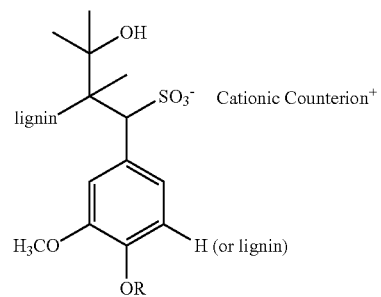

wherein R is hydrogen or

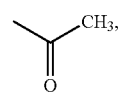

and wherein the cationic counterion$^+$ is a nitrogen-alkyl cationic counterion, a nitrogen-aryl cationic counterion, a nitrogen-alkylaryl cationic counterion, or a nitrogen arylalkyl cationic counterion; and wherein the cationic counterion contains at least eight carbon atoms.

Also described is a process comprising (1) incorporating into an ink jet printing apparatus a phase change ink composition comprising a carrier; an optional colorant; and a lignosulfonate compound of the formula:

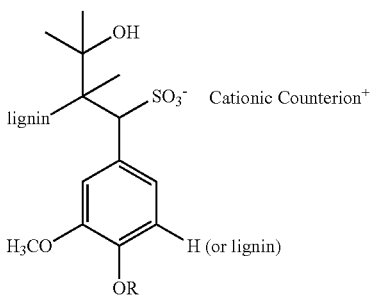

wherein R is hydrogen or

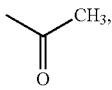

and
wherein the Cationic counterion$^+$ is a nitrogen-alkyl cationic counterion, a nitrogen-aryl cationic counterion, a nitrogen-alkylaryl cationic counterion, or a nitrogen arylalkyl cationic counterion; and wherein the cationic counterion contains at least eight carbon atoms; (2) melting the ink; and (3) causing droplets of the melted ink to be ejected in an imagewise pattern onto a substrate.

Also described is an ink jet printer stick or pellet containing a phase change ink composition comprising a carrier; an optional colorant; and a lignosulfonate compound of the formula:

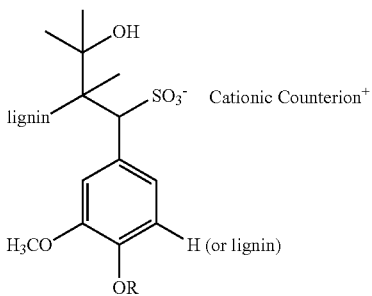

wherein R is hydrogen or

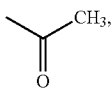

and
wherein the Cationic counterion$^+$ is a nitrogen-alkyl cationic counterion, a nitrogen-aryl cationic counterion, a nitrogen-alkylaryl cationic counterion, or a nitrogen arylalkyl cationic counterion; and wherein the cationic counterion contains at least eight carbon atoms.

BRIEF DESCRIPTION OF THE DRAWINGS

FIG. 1 is a graph illustrating infrared spectra of a sodium lignosulfonate and a modified lignosulfonate in accordance with the present disclosure.

DETAILED DESCRIPTION

The present disclosure is directed to a phase change ink composition comprising a carrier; an optional colorant; and a lignosulfonate compound of the formula:

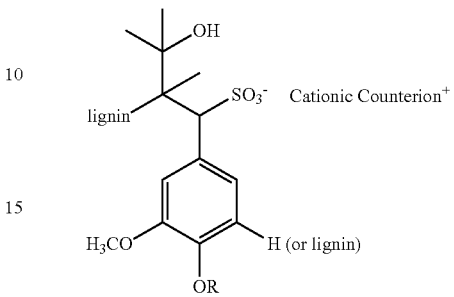

is provided wherein R is hydrogen or

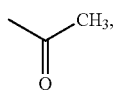

and
wherein the cationic counterion$^+$ is a nitrogen-alkyl cationic counterion, a nitrogen-aryl cationic counterion, a nitrogen-alkylaryl cationic counterion, or a nitrogen arylalkyl cationic counterion; and wherein the cationic counterion contains at least eight carbon atoms.

The present disclosure also encompasses an ink jet printer stick or pellet containing a phase change ink composition as described herein.

In certain embodiments, the lignosulfonate compound cationic counterion includes an alkyl group containing at least eight carbon atoms.

In embodiments, the lignosulfonate compound cationic counterion contains two alkyl chains. In certain embodiments, the lignosulfonate compound cationic counterion contains three alkyl chains.

In embodiments, the cationic counterion is selected from the group consisting of tetraoctylammonium, tetradodecylammonium, tetraoctadecylammonium, N,N-dimethyl dioctadecyl, N,N-dimethyl dioctyl, N,N-dimethyl dodecyl ammonium, N,N,N-trimethyl-1-docosanaminium, behenyl trimethylammonium, N-octadecyltrimethylammonium, mixtures and combinations thereof, and salts thereof. In embodiments, suitable materials for the lignosulfonate cationic counterion are selected from the group consisting of such ARQUAD® materials available from AKZO NOBEL such as Arquad® 316, cocoalkyltrimethylammonium from ARQUAD® C-35, didecydimethylammonium from ARQUAD® 2.10-50, ARQUAD® 2.10-70 HFP, 2.10-80, coco(fractionated) dimethylbenzylammonium from ARQUAD® MCB 33, ARQUAD® MCB 50, ARQUAD® MCB 80, hexadecyltrimethylammonium from ARQUAD® 16-29, stearyltrimethylammonium from ARQUAD® 18-50, behenyltrimethylammonium from ARQUAD® 20-80, mixtures and combinations thereof, and salts thereof.

Examples of suitable alkoxylated quaternary ammonium cationic counterions include Ethoquad® C/12 (cocobis(2-hydroxyethyl)methylammonium chloride) wherein R is coco and m+n=2, Ethoquad® C/25 (cocoalkylmethyl(polyoxyethylene(15))ammonium chloride) where R is coco and m+n=15, Ethoquad® O/12 (oleylbis(2-hydroxyethyl)methylammonium chloride) where R is oleyl and m+n=2 available from Lion Akzo Corporation.

In embodiments, the quaternary ammonium cationic counterion herein can be an oligomer of the formula

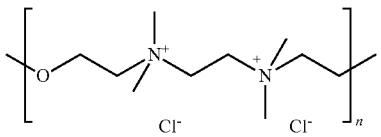

wherein n is at least 1. In a specific embodiment, the quaternary ammonium cationic counterion is poly[oxy-1,2-ethanediyl(dimethyliminio)-1,2-ethanediyl(dimethyliminio)-1,2-ethanediylchloride (1:2)] (Polixetonium chloride) available from Advantis Technologies, Inc.

In other embodiments, the quaternary ammonium cationic counterion is derived from the group consisting of benzyltributylammonium bromide, benzyltributylammonium chloride, benzyltriethylammonium chloride, benzyltriethylammonium bromide, benzyltriethylammonium iodide, benzyltrimethylammonium iodide, benzyltrimethylammonium bromide, benzyltrimethylammonium chloride, and mixtures and combinations thereof (neat or in solution). In embodiments, the cationic counterion is selected from the group consisting of benzyltributylammonium, benzyltriethylammonium, benzyltrimethylammonium, and mixtures and combinations thereof.

In specific embodiments, the quaternary ammonium cationic counterion herein can be esterquats of the formula

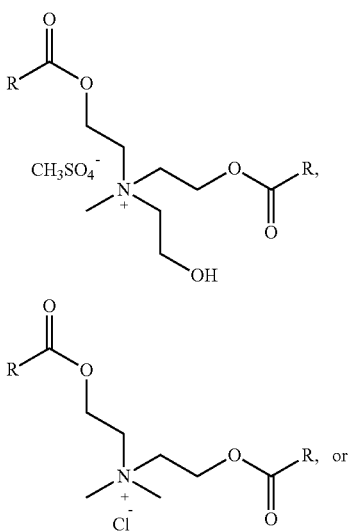

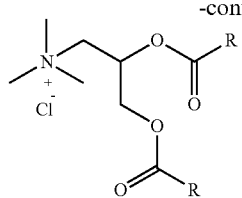

wherein R is n-heptyl, n-nonyl, n-undecyl, n-tridecyl, n-pentadecyl, n-heptadecyl, n-nonadecyl, n-heneicosyl, and mixtures thereof.

Examples of esterquats include, but are not limited to, esterquats such as those available from Kao Chemicals Inc., quaternary ammonium salts of: reacted fatty acids, C10-C20 and unsaturated C16-C18, with triethanolamine (CAS No. 91995-81-2), reacted tallow fatty acids with triethanolamine (CAS No. 93334-15-7), reacted fatty acids, C12-C20 with triethanolamine (CAS No. 91032-11-0), reacted 9-octadecenoic acid (Z) with triethanolamine (CAS No. 94095-35-9), reacted octadecenoic acid with triethanolamine (CAS No. 85408-12-4). Other examples of esterquats include dimethylbis [2-[(1-oxooctadecyl)oxy]ethyl]ammonium chloride (CAS No. 67846-68-8), Dimethylbis[2-[(1-oxohexadecyl)oxy]ethyl] ammonium chloride (97158-31-1), and (Z)-2-hydroxy-3-[(1-oxo-9-octadecenyl)oxy]propyltrimethylammonium chloride (CAS No. 19467-38-0).

In specific embodiments, the cationic counterion is selected from the group consisting of tetraoctyl ammonium, tetradodecyl ammonium, tetraoctadecyl ammonium, cetyltrimethylammonium, N,N-dimethyl dioctadecyl ammonium, N,N-dimethyl dioctyl ammonium, N,N-dimethyl dodecyl ammonium, 1-hexadecanaminium, N,N-dihexacecyl-N-methyl ammonium, and mixtures thereof.

A method for reducing or eliminating altogether drooling and staining of an ink jet print head faceplate by various pigmented solid inks comprises use of the modified lignosulfonate compounds in the phase change ink compositions herein. The lignosulfonic acid compound herein is modified to be insoluble in water and suitable for solid ink applications. In embodiments, the lignosulfonate compound or lignosulfonic acid salt compound includes a counter-ion including at least one long aliphatic tail. In certain embodiments, the lignosulfonic acid compound herein includes a counter-ion having a tail comprising eight or more carbon atoms.

Drooling of an ink is an undesirable phenomenon that is caused when an uncontrollable and unyielding quantity of ink continues to flow through a given print head's nozzles after nullification of an applied pressure during a purge cycle. Applied pressures that resulted in the drooling of the reference ink base were measured and ranged from 2.1 to 2.8 inches of water, as measured by a pressure gauge. These values were somewhat dependent on the history of testing done on various printheads, nevertheless, all of the reference ink bases drooled above the minimum desired applied pressure criterion of about 1.5 inches of water. In the examples, drool pressure was measured with a model number DPIS8 pressure transducer available from Omega Engineering, Inc. (Stamford, Conn.) and calibrated against a manometer. However, other types of pressure transducers may also be used to measure drool pressure.

The drool pressure threshold of a given test ink was determined by first applying the pressure at the range used for the ink base. If drooling was observed, the drooling pressure threshold of that test ink would be determined by applying graduated decreases in pressure. The delta drool pressure of a given test ink was also calculated by the difference of the measured drool pressure thresholds of the reference ink base and the test ink sample.

Δ(Drool Pressure)=Drool Pressure(sample)−Drool Pressure(reference)

It is desirable to have as small as possible a delta drool pressure of a given ink such that optimum jetting and print performance can be realized.

The gauge pressure is that measured pressure realized in the printer's Low Pressure Assist cycle above atmospheric pressure. Drool pressure of a sample ink is the gauge pressure realized that causes the ink to burst out of at least some of the nozzles in the printhead which can be accurately measured by a micropressure gauge. Drooling of inks in a printhead complicate the jetting process due to undesirable inter-nozzle color mixing as well as resulting in the undesirable depletion of ink from the ink loader. Drool pressure of a reference ink is that gauge pressure realized that causes the reference ink to burst out of at least some of the nozzles in the printhead which can be measured by a micropressure gauge. Typically this pressure value satisfies the requirements for successful jetting over the many purge and wipe cleaning cycles that occurs over the lifetime of the printer. Staining of the printhead is the undesirable fouling of the faceplate by an ink, or at least a portion of an ink, which can be qualitatively assessed through visual observation. For example, staining can be seen as ink smeared on the surface of the faceplate. Thus, a desirable observation is when little or no ink is observed on the faceplate. A printhead that has been very undesirably compromised by staining from an ink, or a portion of an ink, will likely be more prone to ink drooling at even lower applied pressures during the course of the printer's normal purge and wipe cleaning cycles. In the present embodiments, there is provided a phase change ink composition that has a drool pressure in a printer of at least 1.5 inches of water. In further embodiments, the composition has a drool pressure in of from about 1.5 inches of water to about 6.0 inches of water or of from about 2.8 inches of water to about 6.0 inches of water.

Pigment Ink is the ink composition including the carrier and colorant; and Ink Base is the ink carrier without the colorant.

Staining of a printhead faceplate occurs when the ink adheres to the faceplate and cannot be removed by typical printer purge-wipe cleaning cycles. Staining is a qualitative test that can be measured by visual observation. Phase change ink containing the modified lignosulfonate compounds herein exhibits little to no staining or fouling as measured by visual observation.

Most solid inks containing pigments drool and stain the faceplate from drool pressures at or approaching Delta Drool Pressure of about −2 inches of water compared to base ink. A solid pigment ink with improved drool performance is highly desirable.

One approach for addressing drool and staining of the faceplate by pigmented solid ink comprises the use of compounds containing acid groups in ink formulations. For example, inks prepared with commercially available synergists such as Solsperse® 5000 (a derivatized sulfonated copper phthalocyanine) and Solsperse® 22000 (a derivatized sulfonated Pigment Yellow 12 as disclosed in U.S. Patent Application Publication Number 2008/0308004, which is hereby incorporated by reference herein in its entirety) at nominal ink loadings below 1% by weight (synergist only) showed no drooling or staining behavior. However, when the synergist loading was increased at or above 2.5% by weight (synergist only) for the purposes of exploring the concept of the synergist itself being a colorant, the inks displayed strong gelling behavior and were not suitable as inkjet inks. It has been discovered that commercially available synergists cannot be used as colorants or as anti-drooling additives.

Lignosulfonates or sulfonated lignins are a water-soluble byproduct from the production of wood pulp using sulfite pulping. Most delignification in sulfite pulping involves acidic cleavage of ether bonds which connect many of the constituents of lignin. The electrophilic carbocations produced during ether cleavage react with bisulfate ions ($HSO_3^-$) to give lignin sulfonates.

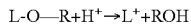

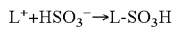

wherein R is a leaving group from lignin; and
wherein $L^+$ is lignin with positive charge.

Lignin can have different molecular weights. Lignin is a cross-linked racemic macromolecule with molecular masses in excess of 10,000 atomic mass units. It is relatively hydrophobic and aromatic in nature. The degree of polymerisation in nature is difficult to measure, since it is fragmented during extraction and the molecule consists of various types of substructures that appear to repeat in a haphazard manner. Different types of lignin have been described depending on the means of isolation. There are three monolignol monomers, methoxylated to various degrees: p-coumaryl alcohol, coniferyl alcohol, and sinapyl alcohol. These lignols are incorporated into lignin in the form of the phenylpropanoids p-hydroxyphenyl (H), guaiacyl (G), and syringyl (S), respectively. Thioglycolysis is an analytical technique for lignin quantitation. Lignin structure can also be studied by computational simulation. See http://en.wikipedia.org/wiki/Lignin.

Lignosulfonic acid sodium salt is a compound that contains functional acid groups and is soluble in water. Lignosulfonates can be recovered from spent pulping liquids by treating same with excess metal hydroxide. The resultant lignosulfonates are typically used as dispersants in products like fodder, dyes and industrial cleaners. In water, the hydrophobic part of the molecule binds to the particle while hydrophilic part binds to the water and thus the particle is kept in solution. Since lignosulfonate metal salt is water soluble, it cannot be used in low polarity solid ink compositions.

In embodiments, a modified lignosulfonic acid compound having a long and/or bulky N-alky/aryl cationic counterion is provided. In specific embodiments, N-alkylated cationic counterions having alkyl chains of at least eight carbon atoms, and in embodiments having alkyl chains of greater than eight carbon atoms are provided. In certain embodiments, cationic counterions are selected from the group consisting of tetraoctylammonium, tetradodecylammonium, tetraoctadecylammonium, trimethylcetyl ammonium, N,N-dimethyl dioctadecyl ammonium, N,N-dimethyl dioctyl ammonium, N,N-dimethyl dodecyl ammonium, and mixtures thereof.

In other embodiments, quaternary ammonium compounds are provided for solubilizing lignosulfonate in solid ink. Quaternary ammonium compounds comprising alkyltrimethylammonium chlorides can be represented by the formula $R-N(CH_3)_3Cl$ wherein R is a long chain alkyl group having at least 8 carbon atoms. A variety of compounds of this class are available varying as to the length and number of long chain alkyl groups attached to the nitrogen atom. Certain quaternary ammonium compounds are marketed by Akzo Nobel N.V. under the trade-name ARQUAD®

In specific embodiments, a modified lignosulfonic acid including N,N-dimethyl dioctadecyl cationic counterion is provided having the formula .

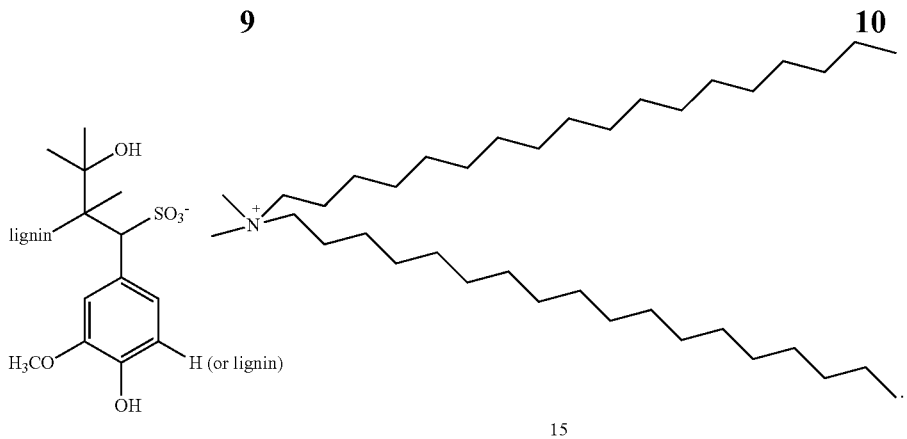
In other specific embodiments, modified lignosulfonic acid including a quaternary ammonium cationic counterion, in embodiments, Arquad® 316 available from Akzo Nobel, is provided having the formula
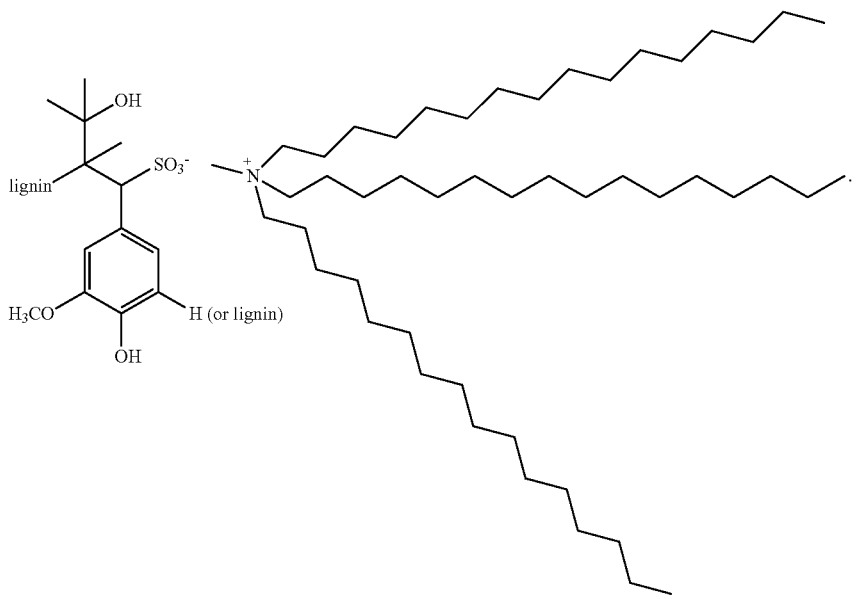
In embodiments, a schematic modification of lignosulfonate with Arquad® 316 is as follows:
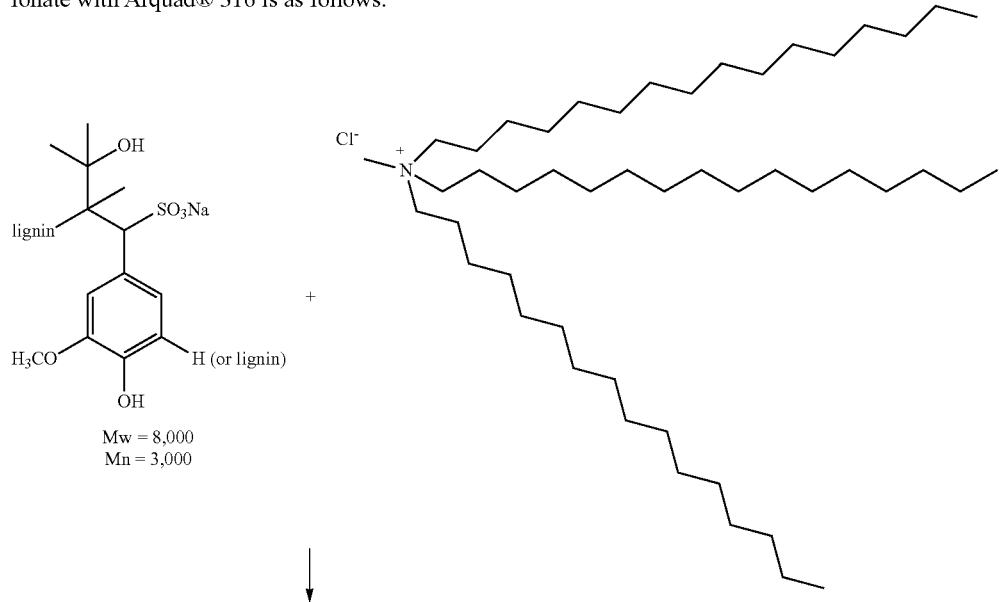

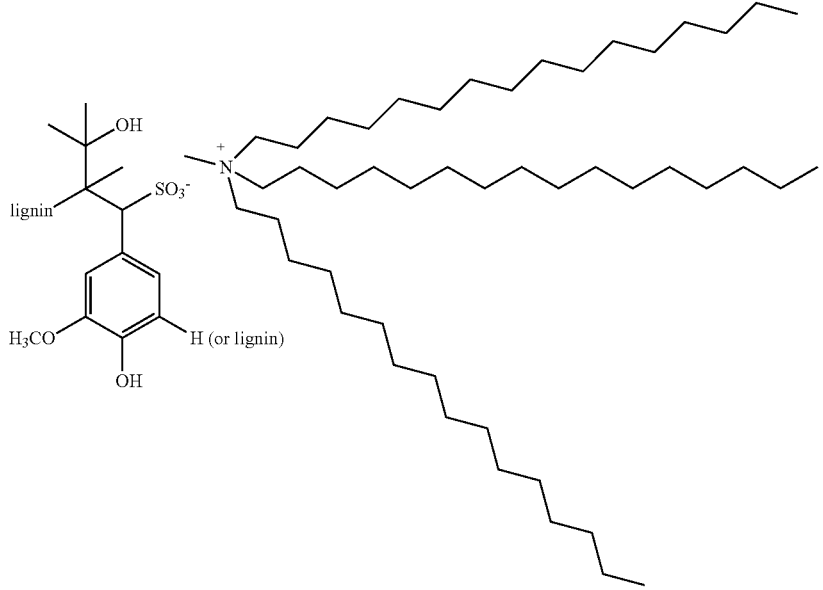

The modified lignsulfonate compound herein can be prepared by any suitable or desired method. In embodiments, a process for preparing a lignosulfonate compound for phase change ink comprises contacting a lignosulfonate metal salt with a compound to provide a nitrogen-alkyl cationic counterion, a nitrogen-aryl cationic counterion, a nitrogen-alkylaryl cationic counterion, or a nitrogen arylalkyl cationic counterion, wherein the cationic counterion contains at least eight carbon atoms, to produce a modified lignosulfonate compound. In embodiments, the process comprise dissolving the lignsosulfonate metal salt can be dissolved in water with heating; adding the compound to provide a nitrogen-alkyl cationic counterion, a nitrogen-aryl cationic counterion, a nitrogen-alkylaryl cationic counterion, or a nitrogen arylalkyl cationic counterion, wherein the cationic counterion contains at least eight carbon atoms; and optionally, isolating the modified lignosulfonate compound, such as by filtration.

The process may include additional process steps. The process can further comprise steps of cooling and isolating the product which steps can be performed according to the knowledge of a person having ordinary skill in the art. Various techniques for these processing steps are known in the chemical arts.

Lignosulfonate metal salts can be obtained commercially. For example, lignosulfonic acid sodium salt, lignosulfonic acid calcium salt, and lignosulfonic acid acetate sodium salt can be obtained from Sigma Aldrich.

Cationic counterion components for modifying the lignosulfonate metal salts can be obtained commercially. For example, certain quaternary ammonium compounds are available under the trade-name ARQUAD® from Akzo Nobel N.V.

Heating of the mixture containing the lignosulfonate and the ammonium cationic counterion can be to any suitable or desired temperature, such as from about room temperature, or about 20° C. to about 80° C. Heating can be for any suitable or desired amount of time. In embodiments, heating comprises heating to a temperature of from about 20° C. to about 80° C. for a period of from about 30 minutes to about 2 hours.

The amount of cationic counterion component can be any suitable or desired amount. For example, the amount of quaternary ammonium salt used for the preparation of modified lignosulfonic acid herein can be determined as a function of the sodium content present in the starting material. The lignosulfonate can be dissolved in water with heating and the quaternary ammonium salt can be added gradually with stiffing. The resultant insoluble product can be isolated such as by filtration.

The lignosulfonate compound can be present in the phase change ink in any suitable or desired amount. In embodiments, the lignosulfonate compound is present in an amount of from about 0.25 to about 6, or from about 0.5 to about 5, or from about 1 to about 4, percent by weight based upon the total weight of the phase change ink composition.

The phase change ink composition can include an ink jet vehicle or carrier composition which can comprise wax and other optional components. The wax or carrier composition can be present in the phase change ink in any suitable or desired amount. In embodiments, wax or carrier composition is present in an amount of from about 50 to about 99, or from about 70 to about 98, or from about 90 to about 95, percent by weight based upon the total weight of the phase change ink composition.

Any desired or effective carrier composition can be used. Examples of suitable amides include, for example, diamides, triamides, tetra-amides, cyclic amides and the like. Suitable triamides include, for example, those disclosed in U.S. Pat. No. 6,860,930, the entire disclosure of which is incorporated herein by reference. Suitable other amides, such as fatty amides including monoamides, tetra-amides, and mixtures thereof, are disclosed in, for example, U.S. Pat. Nos. 4,889,560, 4,889,761, 5,194,638, 4,830,671, 6,174,937, 5,372,852, 5,597,856, and 6,174,937, and British Patent No. GB 2 238 792, the entire disclosures of each are incorporated herein by reference.

Also suitable as phase change ink carrier materials are isocyanate-derived resins and waxes, such as urethane isocyanate-derived materials, urea isocyanate-derived materials, urethane/urea isocyanate-derived materials, mixtures thereof, and the like. Mixtures of fatty amide materials and isocyanate-derived materials can also be employed as the ink carrier composition for inks of the present disclosure.

Additional suitable phase change ink carrier materials for the present disclosure include paraffins, microcrystalline waxes, polyethylene waxes, ester waxes, amide waxes, fatty acids, fatty alcohols, fatty amides and other waxy materials, sulfonamide materials, resinous materials made from different natural sources (such as, for example, tall oil rosins and rosin esters), and the like, as well as mixtures thereof.

In embodiments, the phase change ink compositions comprises (a) a polyethylene wax, present in the ink in an amount from about 25 percent by weight of the ink to about 60 percent by weight of the ink, although the amount can be outside of these ranges; (b) a stearyl stearamide wax, present in the ink in an amount of from about 8 percent by weight of the ink to about 32 percent by weight of the ink, although the amount can be outside of these ranges; (c) a triamide wax as prepared in Example 1 of U.S. Pat. No. 6,860,930, which is hereby incorporated by reference herein in its entirety; (d) a urethane resin derived from the reaction of two equivalents of hydroabietyl alcohol and one equivalent of isophorone diisocyanate, present in the ink in an amount of from about 6 percent by weight of the ink to about 16 percent by weight of the ink, although the amount can be outside of these ranges; (e) a urethane resin that is the adduct of three equivalents of stearyl isocyanate and a glycerol-based propoxylate alcohol, present in the ink in an amount of from about 2 percent by weight of the ink to about 13 percent by weight of the ink, although the amount can be outside of these ranges; and (f) an antioxidant, present in the ink in an amount of from about 0.01 percent by weight of the ink to about 1 percent by weight of the ink, although the amount can be outside of these ranges.

In embodiments, the phase change ink of the present disclosure contains a carrier (that is, the non-colorant components of the ink) in any desired or effective amount, such as from about 0.1 percent by weight of the ink to about 90 percent by weight of the ink, although the amount can be outside of these ranges.

The phase change ink herein can contain any suitable or desired colorant such as dyes, pigments, mixtures thereof, and the like. The colorant can be present in the ink in any desired or effective amount to obtain the desired color or hue, in embodiments, in an amount of from about 0.1 percent by weight of the ink to about 50 percent by weight of the ink, from about 0.1 percent by weight of the ink to about 20 percent by weight of the ink, although the amount can be outside of these ranges.

The inks of the present disclosure can also optionally contain an antioxidant. Antioxidants compositions protect printed images from oxidation and also protect ink components from oxidation during the heating portion of the ink preparation process. Specific examples of suitable antioxidants include NAUGUARD® 445, NAUGUARD® 524, NAUGUARD® 76, and NAUGUARD® 512 (commercially available from Uniroyal Chemical Company), IRGANOX® 1010 (commercially available from Ciba Geigy), and the like. When present, the optional antioxidant is present in the ink in any desired or effective amount, in embodiments at from about 0.01 percent by weight of the ink to about 20 percent by weight of the ink, although the amount can be outside of these ranges.

The inks of the present disclosure can also optionally contain one or more dispersants and/or one or more surfactants for their known properties, such as controlling wetting properties of the ink composition, and stabilizing pigmented colorants. Any suitable or desired dispersant can be selected, such as Solsperse® 13240 and Solsperse® 11000 dispersants, available from Lubrizol, and dispersants described U.S. Pat. No. 7,973,186, which is hereby incorporated by reference herein in its entirety. The dispersant or surfactant may be present in the phase change ink in any suitable or desired amount, such as from about 0.1 to about 25 percent by weight of the ink, although the amount can be outside of this range.

The inks of the present disclosure can also optionally contain a viscosity modifier. Suitable viscosity modifiers include aliphatic ketones, such as stearone, and the like. When present, the optional viscosity modifier is present in the ink in any desired or effective amount, such as from about 0.1 percent by weight of the ink to about 99 percent by weight of the ink, although the amount can be outside of these ranges.

In embodiments, the ink compositions of the present disclosure have melting points of no lower than about 50° C., to no higher than about 160° C., although the melting point can be outside of these ranges.

The ink compositions of the present disclosure generally have melt viscosities at the jetting temperature (jetting temperature being, in embodiments, from about 75° C. to about 180° C., although the jetting temperature can be outside of this range) of no more than about 30 centipoise to no less than about 2 centipoise, although the melt viscosity can be outside of these ranges.

In embodiments, the lignosulfonate compound is present in the ink carrier during the incorporation of a colorant wherein the colorant is a dye or a pigment. In other embodiments, the lignosulfonate compound is added after the formation of the first ink containing a colorant wherein the colorant is a dye or a pigment to form the second ink. The lignosulfonate compound in embodiments can be added and co-melted with one of the ink carrier components, some of the ink carrier components, most of the ink carrier components or all of the ink carrier components used to form the ink. In embodiments, the lignosulfonate compound can be added to form the ink in any suitable manner including mixing such as by stirring, such as by high shear mixing, with or without milling media, such as by milling including by ball milling and by attrition or by any other suitable method. In embodiments, the lignosulfonate compound can be added as a powder or a molten liquid to form the ink.

The phase ink compositions of the present disclosure can be prepared by any desired or suitable method. For example, the ink ingredients can be mixed together, followed by heating, to a temperature of at least about 100° C. to no more than about 140° C., although the temperature can be outside of this range, and stiffing until a homogeneous ink composition is obtained, followed by cooling the ink to ambient temperature (typically from about 20 to about 25° C.). The inks of the present disclosure are solid at ambient temperature. In a specific embodiment, during the formation process, the inks in their molten state are poured into molds and then allowed to cool and solidify to form ink sticks.

The inks of the present disclosure can be employed in apparatus for direct printing ink jet processes and in indirect (offset) printing ink jet applications. Another embodiment of the present disclosure is directed to a process which comprises incorporating an ink of the present disclosure into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment of the present disclosure is directed to a process which comprises incorporating an ink of the present disclosure into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. Inks of the present disclosure can also be employed in other hot melt printing processes, such as hot melt acoustic ink jet printing, hot melt thermal ink jet printing, hot melt continuous stream or deflection ink jet printing, and the like. Phase change inks of the present disclosure can also be used in printing processes other than hot melt ink jet printing processes.

In embodiments, a process herein comprises (1) incorporating into an ink jet printing apparatus a phase change ink composition comprising a wax; an optional colorant; and a lignosulfonate compound of the formula:

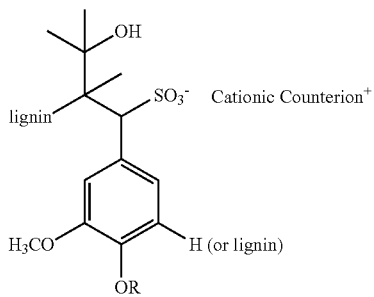

is provided wherein R is hydrogen or

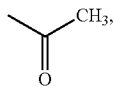

and
wherein the cationic counterion⁺ is a nitrogen-alkyl cationic counterion, a nitrogen-aryl cationic counterion, a nitrogen-alkylaryl cationic counterion, or a nitrogen arylalkyl cationic counterion; and wherein the cationic counterion contains at least eight carbon atoms; (2) melting the ink; and (3) causing droplets of the melted ink to be ejected in an imagewise pattern onto a substrate.

Any suitable substrate or recording sheet can be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, HAMMERMILL LASERPRINT® paper, and the like, transparency materials, fabrics, textile products, plastics, polymeric films, inorganic substrates such as metals and wood, and the like.

In embodiments, an ink jet printer stick or pellet is provided containing a phase change ink composition comprising a wax; an optional colorant; and a lignosulfonate compound of the formula:

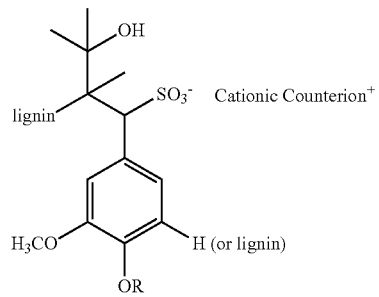

wherein R is hydrogen or

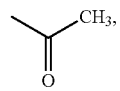

and
wherein the cationic counterion⁺ is a nitrogen-alkyl cationic counterion, a nitrogen-aryl cationic counterion, a nitrogen-alkylaryl cationic counterion, or a nitrogen arylalkyl cationic counterion; and wherein the cationic counterion contains at least eight carbon atoms.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

The ink components below were combined as described in the examples below. The percentages in the ink formulation are based on weight. Several inks and ink bases containing various dispersants with or without modified lignosulfonic acid were evaluated for drool in a Xerox® print head.

Polyethylene wax herein is a polyethylene wax having an average peak molecular weight of from about 350 to about 730 grams per mole, a polydispersity of from about 1.03 to about 3.0, and an asymmetrical molecular weight distribution skewed toward the high molecular weight end, obtained from Baker Petrolite and modified as described in U.S. Pat. No. 7,407,539, which is hereby incorporated by reference herein in its entirety.

Triamide wax as prepared in Example 1 of U.S. Pat. No. 6,860,930, which is hereby incorporated by reference herein in its entirety.

KEMAMIDE® S-180, stearyl stearamide available from Chemtura Corporation.

KE-100, triglycerides of hydrogenated abietic acid, available from Arakawa Chemical Industries.

Urethane resin as prepared in Example 4 of U.S. Pat. No. 6,309,453, which is hereby incorporated by reference herein in its entirety.

Naugard® 445, aromatic amine antioxidant available from Chemtura Corporation.

Arquad® 316, tricetyl ammonium chloride, available from Akzo Nobel.

Lignosulfonic acid sodium salt and N,N-dimethyldioctadecyl bromide, available from Sigma-Aldrich Co. LLC.

Solsperse® 13240 and Solsperse® 11000 dispersants, available from The Lubrizol Corporation, used neat.

Dispersants described in U.S. Pat. No. 7,973,186, which is hereby incorporated by reference herein in its entirety.

Example 1

Standard ink formulation. In a 500 milliliter beaker were introduced 86.7 grams (54.2%) distilled polyethylene wax, 20.4 grams (12.75%) triamide wax as prepared in Example 1 of U.S. Pat. No. 6,860,930, 28.56 grams (17.85%) KEMAMIDE® S-180, 20.4 grams (12.75%) KE-100, 3.59 grams (2.24%) urethane resin as prepared in Example 1 of U.S. Pat. No. 6,309,453, 0.34 grams (0.21%) Naugard® 445. The solids were allowed to melt in an oven at 130° C. until all components were molten. The resultant ink base was filtered through a 5 μm stainless steel mesh.

Comparative Example 2

Ink base containing S11000® neat. In a 500 milliliter beaker were introduced 82.16 grams (51.38%) distilled polyethylene wax, 21.55 grams (13.47%) triamide wax as prepared in Example 1 of U.S. Pat. No. 6,860,930, 27.84 grams (17.4%) KEMAMIDE® S-180, 21.5 grams (13.47%) KE-100, 3.84 grams (2.4%) urethane resin as prepared in Example 4 of U.S. Pat. No. 6,309,453, 0.496 grams (0.31%) Naugard® 445 and 2.56 grams (1.6%) Solsperse® 11000. The mixture was allowed to melt in an oven at 130° C. until all components were molten. The resultant ink base was filtered through a 5 μm stainless steel mesh.

Comparative Example 3

Ink base containing S13240® neat. In a 500 milliliter beaker were introduced 84.94 grams (53.1%) distilled polyethylene wax, 20.0 grams (12.5%) triamide wax as prepared in Example 1 of U.S. Pat. No. 6,860,930, 28.0 grams (17.5%) KEMAMIDE® S-180, 20 grams (12.5%) KE-100, 3.52 grams (2.2%) urethane resin as prepared in Example 4 of U.S. Pat. No. 6,309,453, 0.336 grams (0.21%) Naugard® 445 and 3.2 grams (2%) Solsperse® 13240. The mixture was allowed to melt in an oven at 130° C. until all components were molten. The resultant ink base was filtered through a 5 μm stainless steel mesh.

Example 4

Ink base containing Solsperse® 13240 neat and modified lignosulfonic acid. In a 500 milliliter beaker were introduced 79.98 grams (49.99%) distilled polyethylene wax, 21.0 grams (13.1%) triamide wax as prepared in Example 1 of U.S. Pat. No. 6,860,930, 27.2 grams (17.0%) KEMAMIDE® S-180, 21 grams (13.1%) KE-100, 4.0 grams (2.5%) urethane resin as prepared in Example 4 of U.S. Pat. No. 6,309,453, 0.496 grams (0.31%) Naugard® 445, and 3.2 grams (2%) Solsperse® 13240. The mixture was allowed to melt in an oven at 130° C. until all components were molten. When the mixture looked homogenous, 3.2 grams (2.0%) of modified lignosulfonic acid of the formula

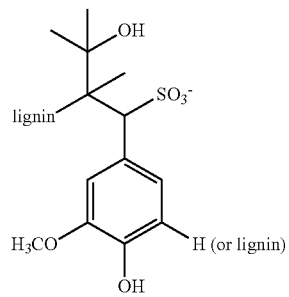

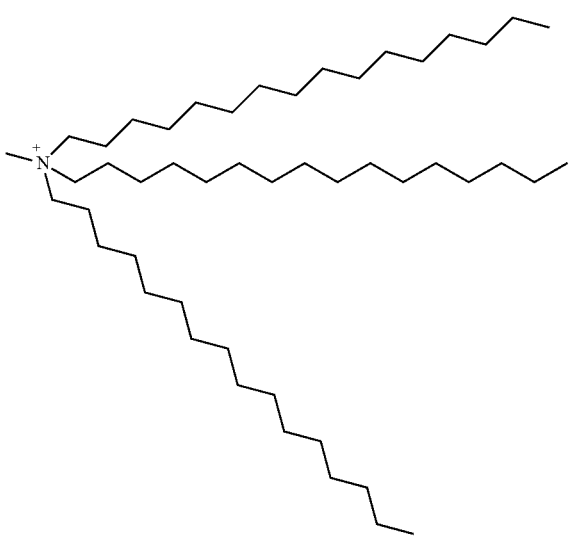

were added with stirring. The resultant mixture was filtered through a 26 μm stainless steel mesh followed by a filtration through 5 μm stainless steel mesh to remove unmodified lignin.

Comparative Example 5

In a 500 milliliter beaker were introduced 84.78 grams (53.0%) distilled polyethylene wax, 20 grams (12.5%) triamide wax as prepared in Example 1 of U.S. Pat. No. 6,860, 930, 28 grams (17.5%) KEMAMIDE® S-180, grams (12.5%) KE-100, 3.6 g (2.25%) urethane resin as prepared in Example 4 of U.S. Pat. No. 6,309,453, 0.336 grams (0.21%) Naugard® 445, and 3.28 grams (2.05%) of a dispersant compound as prepared in Example 1 of U.S. Pat. No. 7,973,186. The mixture was allowed to melt in an oven at 130° C. until all components were molten. The resultant mixture was filtered through a 5 μm stainless steel mesh.

Example 6

In a 500 milliliter beaker were introduced 80.27 grams (50.17%) distilled polyethylene wax, 20.48 grams (12.8%) triamide wax as prepared in Example 1 of U.S. Pat. No. 6,860,930, 28.27 grams (17.67%) KEMAMIDE® S-180, 20.48 grams (12.8%) KE-100, 3.6 grams (2.25%) urethane resin as prepared in Example 4 of U.S. Pat. No. 6,309,453, 0.336 grams (0.21%) Naugard® 445, and 3.28 grams (2.05%) a dispersant compound as prepared in Example 1 of U.S. Pat. No. 7,973,186. The mixture was allowed to melt in an oven at 130° C. until all components were molten. When the mixture looked homogenous, 3.28 grams (2.05%) of modified lignosulfonic acid of the formula

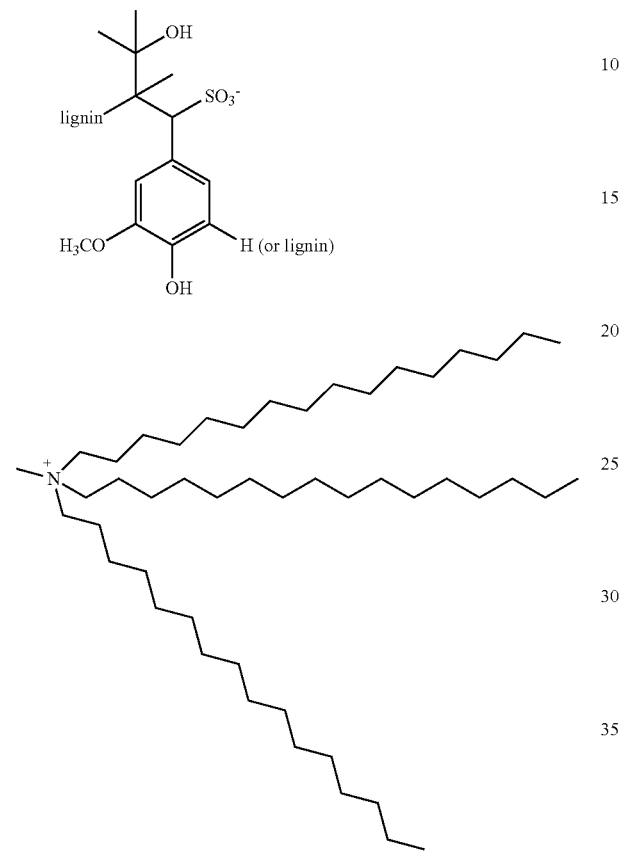

were added with stirring. The resultant mixture was filtered through a 26 μm stainless steel mesh followed by a filtration through 5 μm stainless steel mesh to remove unmodified lignin.

Comparative Example 7

In a 500 milliliter beaker were introduced 84.86 grams (53.04%) distilled polyethylene wax, 20.0 grams (12.5%) triamide wax as prepared in Example 1 of U.S. Pat. No. 6,860,930, 28.0 grams (17.5%) KEMAMIDE® S-180, 20 grams (12.5%) KE-100, 3.52 grams (2.2%) urethane resin as prepared in Example 4 of U.S. Pat. No. 6,309,453, 0.336 grams (0.21%) Naugard® 445, and 3.2 grams (2%) a dispersant compound as prepared in Example 2 of U.S. Pat. No. 7,973,186. The mixture was allowed to melt in an oven at 130° C. until all components were molten. The resultant ink base was filtered through a 5 μm stainless steel mesh.

Example 8

In a 500 milliliter beaker were introduced 80.27 grams (50.17%) distilled polyethylene wax, 20.48 grams (12.8%) triamide wax as prepared in Example 1 of U.S. Pat. No. 6,860,930, 28.27 grams (17.67%) KEMAMIDE® S-180, 20.48 grams (12.8%) KE-100, 3.6 grams (2.25%) urethane resin as prepared in Example 4 of U.S. Pat. No. 6,309,453, 0.336 grams (0.21%) Naugard® 445, and 3.28 grams (2.05%) of a dispersant compound as prepared in Example 2 of U.S. Pat. No. 7,973,186. The mixture was allowed to melt in an oven at 130° C. until all components were molten. When the mixture looked homogenous, 3.28 grams (2.05%) of modified lignosulfonic acid of the formula

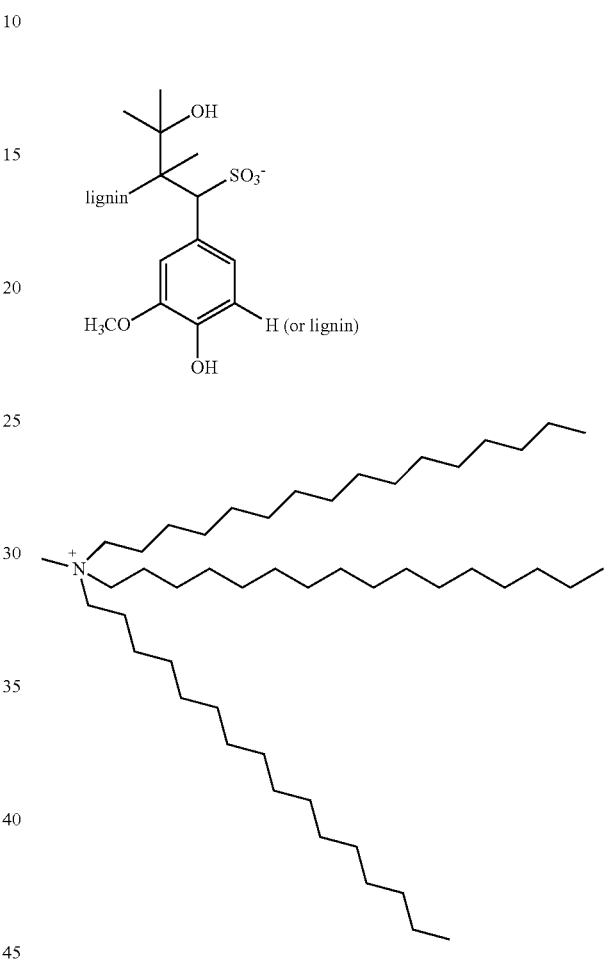

were added with stirring. The resultant mixture was filtered through a 26 μm stainless steel mesh followed by a filtration through 5 μm stainless steel mesh to remove unmodified lignin.

Example 9

In a 500 milliliter beaker were introduced 79.68 grams (49.8%) distilled polyethylene wax, 19.46 grams (12.16%) triamide wax as prepared in Example 1 of U.S. Pat. No. 6,860,930, 27.65 grams (17.28%) KEMAMIDE® S-180, 19.0 grams (12.16%) KE-100, 3.6 grams (2.25%) urethane resin as prepared in Example 4 of U.S. Pat. No. 6,309,453, 0.336 grams (0.21%) Naugard® 445, and 3.28 grams (2.05%) a dispersant compound as prepared in Example 2 of U.S. Pat. No. 7,973,186. The mixture was allowed to melt in an oven at 130° C. until all components were molten. When the mixture looked homogenous, 6.54 grams (4.09%) of modified lignosulfonic acid of the formula

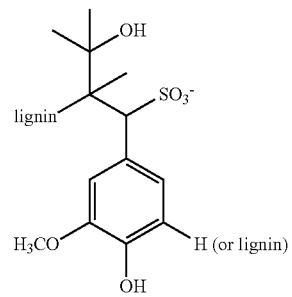

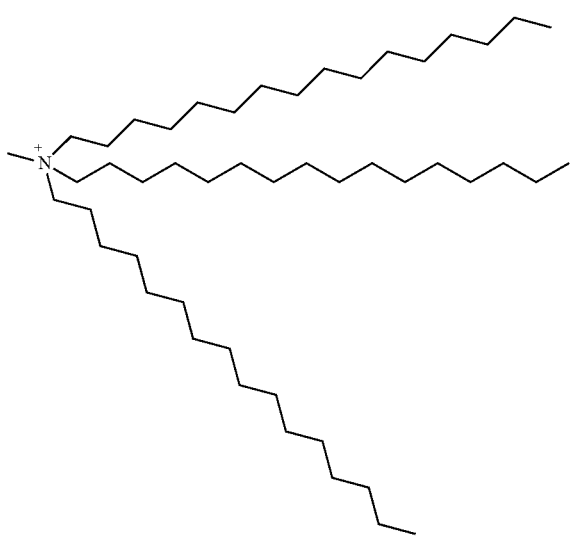

were added with stirring. The resultant mixture was filtered through a 26 μm stainless steel mesh followed by a filtration through 5 μm stainless steel mesh to remove unmodified lignin.

Comparative Example 10

The following materials were weighed in a 600 milliliter beaker such that the accompanying weight percentages also include the pigment, dispersant and pigment synergist that were added in subsequent mixing step: 81.25 grams (50.78%) of a distilled polyethylene wax (a polyethylene wax having an average peak molecular weight of from about 350 to about 730 grams per mole, a polydispersity of from about 1.03 to about 3.0, and an asymmetrical molecular weight distribution skewed toward the high molecular weight end, obtained from Baker Petrolite and modified as described in U.S. Pat. No. 7,407,539, which is hereby incorporated by reference herein in its entirety, 19.95 grams (12.47%) triamide wax prepared as described in Example 1 of U.S. Pat. No. 6,860,930, 27.79 grams (17.37%) of KEMAMIDE® S-180, 19.95 grams (12.47%) KE-100 resin, 3.76 grams (2.3%) of a urethane resin as prepared in Example 4 of U.S. Pat. No. 6,309,453, the disclosure of which is totally incorporated herein by reference, 0.5 grams (0.31%) Naugard® 445, and 2.56 grams (1.8%) of Solsperse® 11000. The materials were melted in an oven at 120° C., mixed well, and then transferred to a Szevari 01 attritor, available from Union Process, that was also heated to 120° C., and charged with 1800 grams 440 C type ⅛ inch diameter stainless steel balls available from Hoover Precision Products. A heated impeller was attached to the assembly whereupon the impeller speed was adjusted such that the stainless steel balls at the top of the vessel began to tumble gently over each other. To this stirring solution were added 3.2 grams (2%) of a C.I. Pigment Blue 15:3 pigment commercially available from Clariant Corporation, 0.8 grams (0.5%) of a cyan pigment synergist commercially available from Sun Chemical Corporation. The pigmented ink was allowed to attrite at 250 revolutions per minute for 18 hours upon which the final attrited mixture was isolated from the stainless steel balls and filtered with a 5 micron stainless steel mesh using a KST-47 filtration apparatus, commercially available from Advantec Corporation.

Example 11

Cyan ink containing lignosulfonic acid was prepared as in Comparative Example 10, except that 3.6 grams (2.25% of the final ink) lignosulfonic acid derivative of the formula

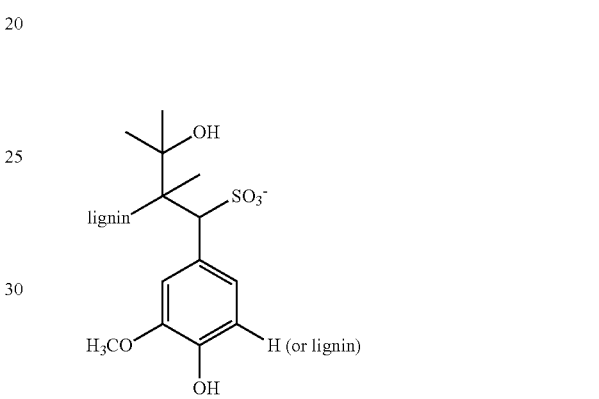

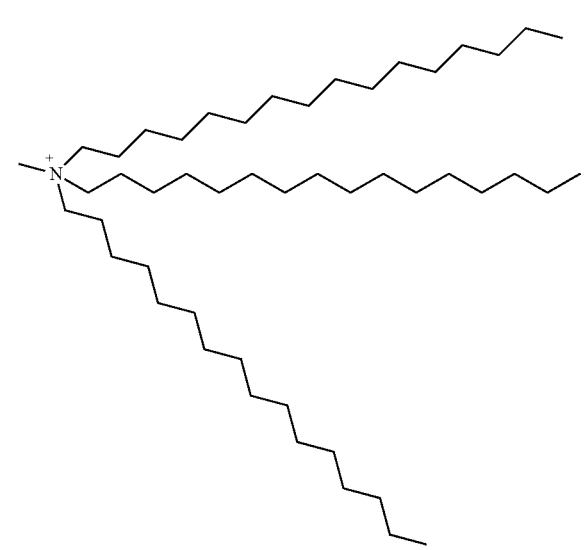

were added and attrited and filtered in the same manner as in Example 10.

FIG. 1 is a graph illustrating infrared spectra of a sodium lignosulfonate 10 and a modified lignosulfonate 12 in accordance with the present disclosure. The modified lignosulfonate compound 12 modified with Arquad® 316 contains an intense peak at 2922.69 $cm^{-1}$ and 2852.39 $cm^{-1}$ wavenumbers due to $sp^3$ stretching of C—H from substitution of sodium with Arquad® 316. The non-modified lignosulfonate 10 has a comparatively weaker peak at 2936.71 $cm^{-1}$ wavenumbers.

Drool Testing and Results.

Drooling of an ink can be described as an uncontrollable and unyielding quantity of ink that continues to flow through a given print head's nozzles after nullification of an applied pressure during a purge cycle. Staining, also an undesirable phenomenon, can be described as all or a portion of the latent ink that remains on the print head faceplate even after several printer purge/wipe cycles. To assess resistance to drooling, the ink was tested in a Xerox® print head.

Applied pressures that resulted in the drooling of the reference ink base were measured and ranged from 2.1 to 2.8 inches of water, as measured by a pressure gauge. These values were somewhat dependent on the history of testing done on various printheads, nevertheless, all of the reference ink bases drooled above the minimum desired applied pressure criterion of about 1.5 inches of water. In the examples, drool pressure was measured with a model number DPIS8 pressure transducer available from Omega Engineering, Inc. (Stamford, Conn.) and calibrated against a manometer. However, other types of pressure transducers may also be used to measure drool pressure.

The drool pressure threshold of a given test ink was determined by first applying the pressure at the range used for the ink base. If drooling was observed, the drooling pressure threshold of that test ink would be determined by applying graduated decreases in pressure.

The delta drool pressure of a given test ink was also calculated by the difference of the measured drool pressure thresholds of the reference ink base and the test ink sample.

Quantification of ink drool was determined as follows:

Δ(Drool Pressure)=Drool Pressure(sample)−Drool Pressure(reference)

Thus, a test ink having negative differential inches water, relative to ink base, is drooling at a lower applied pressure. Drool and face plate fouling test results for exemplary ink bases and inks are presented in the Table below:

TABLE 1

| Example | Type | Dispersant (2% of ink) | Weight % Modified Lignosulfonic Acid | Drool Pressure (gauge), inches of water | Drool as Δ pressure (inches of water) | Visual Observation of Fouling |
|---|---|---|---|---|---|---|
| 1 | Ink base | None | 0 | 2.20 | 0 | No |
| Comparative 2 | Ink base | Solsperse ® 11000 | 0 | 0.71 | −1.5 | Yes |
| Comparative 3 | Ink base | Solsperse ® 13240 | 0 | 0.23 | −1.97 | Yes |
| 4 | Ink base | Solsperse ® 13240 | 2 | 1.53 | −0.67 | No |
| Comparative 5 | Ink base | [1]Dispersant Compound 1 | 0 | 1.56 | −0.64 | Yes |
| 6 | Ink base | [1]Dispersant Compound 1 | 2 | 2.20 | 0 | No |
| Comparative 7 | Ink base | [2]Dispersant Compound 2 | 0 | 1.01 | −1.2 | Yes |
| 8 | Ink base | [2]Dispersant Compound 2 | 2 | 1.45 | −0.75 | Slight |
| 9 | Ink base | [2]Dispersant Compound 2 | 4 | 2.20 | 0 | No |
| Comparative 10 | Cyan ink | Solsperse ® 11000 | 0 | 1.05 | −1.2 | Yes |
| 11 | Cyan ink | Solsperse ® 11000 | 1 | 1.71 | −0.49 | No |

[1]dispersant compound as prepared in Example 1 of U.S. Pat. No. 7,973,186
[2]dispersant compound as prepared in Example 2 of U.S. Pat. No. 7,973,186

Δ drool pressure values of about −0.8 to 0 inches of water are especially preferred as these values indicate a normal range of print head values for optimum performance of inks over purge/wipe cycles. As can be seen from the Table, examples of the present disclosure incorporating the modified lignosulfonic acid compound provided drool values of Δ drool pressure between −0.8 to 0 inches of water which was a significant improvement over those comparative examples that did not incorporate the modified lignosulfonic acid compound. For instance, Example 3, which contains Solsperse® 13240, resulted in a catastrophic failure such that auto-drooling and severe fouling of the print head was evident. The addition of just 2% by weight modified lignosulfonic acid compound of the present disclosure (to form the ink of Example 4) resulted in a much-reduced differential drool pressure where no fouling of the print head was observed. Further, the addition of just 1% modified lignosulfonic acid compound of the present disclosure to a cyan ink containing Solsperse® 11000 significantly reduced the differential drool pressure such that it was within an acceptable range.

In embodiments, the phase change ink herein exhibits little to no staining or fouling as measured by visual observation.

Thus, improved modified lignosulfonic acid compounds are described that are compatible for use in solid ink formulations and that provided improved drooling and staining characteristics of the solid ink. Further, green or bio-renewable modified lignosulfonic acid additives are described for pigmented solid ink that provide improved face plate drooling and staining characteristics.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A phase change ink composition comprising:
a carrier;
an optional colorant;
an optional dispersant; and
a lignosulfonate compound of the formula:

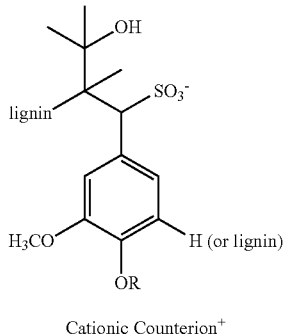

Cationic Counterion⁺ wherein R is hydrogen or

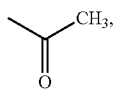

and
wherein the cationic counterion⁺ is a nitrogen-alkyl cationic counterion, a nitrogen-aryl cationic counterion, a nitrogen-alkylaryl cationic counterion, or a nitrogen arylalkyl cationic counterion; and wherein the cationic counterion contains at least eight carbon atoms.

2. The phase change ink of claim 1, wherein the cationic counterion includes an alkyl group containing at least eight carbon atoms.

3. The phase change ink of claim 1, wherein the cationic counterion comprises two alkyl chains.

4. The phase change ink of claim 1, wherein the cationic counterion comprises three alkyl chains.

5. The phase change ink of claim 1, wherein the cationic counterion is selected from the group consisting of tetraoctylammonium, tetradodecylammonium, tetraoctadecylammonium, N,N-dimethyl dioctadecyl ammonium, N,N-dimethyl dioctyl ammonium, N,N-dimethyl dodecyl ammonium, N,N,N-trimethyl-1-docosanaminium, behenyl trimethylammonium, N-octadecyltrimethylammonium, mixtures and combinations thereof, and salts thereof.

6. The phase change ink of claim 1, wherein the cationic counterion is selected from the group consisting of cocoalkyltrimethylammonium, didecydimethylammonium, coco (fractionated) dimethylbenzylammonium, hexadecyltrimethylammonium, stearyltrimethylammonium, behenyltrimethylammonium, mixtures and combinations thereof, and salts thereof.

7. The phase change ink of claim 1, wherein the cationic counterion is a compound of the formula

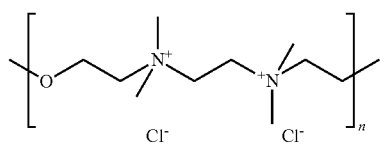

wherein n is at least 1.

8. The phase change ink of claim 1, wherein the cationic counterion is selected from the group consisting of benzyltributylammonium, benzyltriethylammonium, benzyltrimethylammonium, and mixtures and combinations thereof.

9. The phase change ink of claim 1, wherein the cationic counterion is a compound of the formula

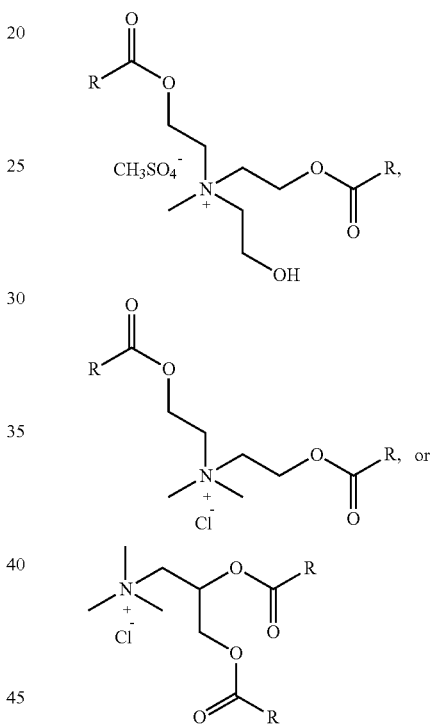

wherein R is n-heptyl, n-nonyl, n-undecyl, n-tridecyl, n-pentadecyl, n-heptadecyl, n-nonadecyl, n-heneicosyl, and mixtures thereof.

10. The phase change ink of claim 1, wherein the lignosulfonate compound is of the formula:

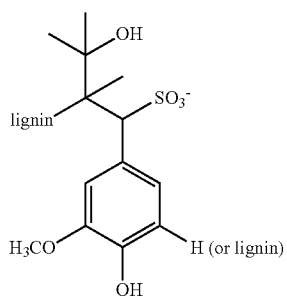

-continued

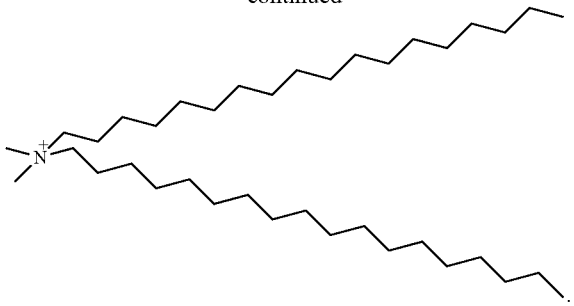

11. The phase change ink of claim 1, wherein the lignosulfonate compound is of the formula:

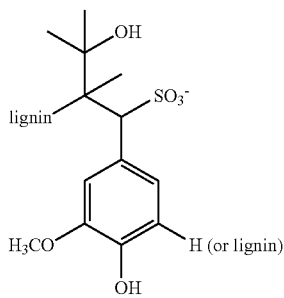

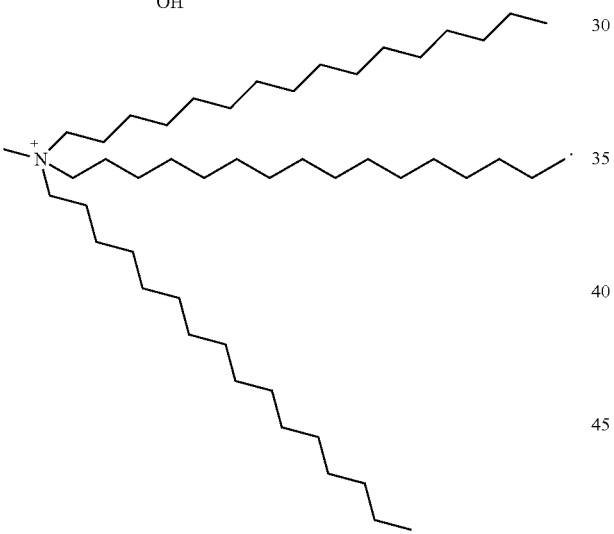

12. The phase change ink of claim 1, wherein the phase change ink has a drool pressure in a printer of at least 1.5 inches of water.

13. The phase change ink of claim 1, wherein the phase change ink exhibits little to no staining or fouling as measured by visual observation.

14. The phase change ink of claim 1, wherein the lignosulfonate compound is present in an amount of from about 1 to about 4 percent by weight based upon the total weight of the phase change ink composition.

15. The phase change ink of claim 1, wherein the carrier is present in an amount of from about 90 to about 95 percent by weight based upon the total weight of the phase change ink composition.

16. The phase change ink of claim 1, further comprising: a monoamide, a triamide, or a mixture thereof.

17. The phase change ink of claim 1, further comprising: (a) stearyl stearamide, (b) triamide, or (c) mixtures thereof.

18. The phase change ink of claim 1, further comprising: a mixture of one or more amides and one or more isocyanate-derived materials.

19. A process comprising:
(1) incorporating into an ink jet printing apparatus a phase change ink composition comprising a carrier; an optional colorant; and a lignosulfonate compound of the formula:

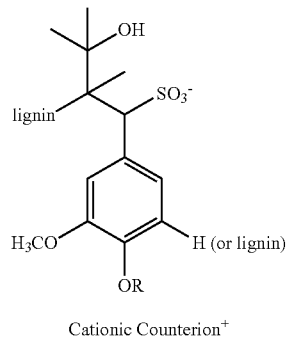

wherein R is hydrogen or

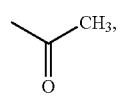

and
wherein the Cationic counterion$^+$ is a nitrogen-alkyl cationic counterion, a nitrogen-aryl cationic counterion, a nitrogen-alkylaryl cationic counterion, or a nitrogen arylalkyl cationic counterion; and wherein the cationic counterion contains at least eight carbon atoms;
(2) melting the ink; and
(3) causing droplets of the melted ink to be ejected in an imagewise pattern onto a substrate.

20. An ink jet printer stick or pellet containing a phase change ink composition comprising a carrier; an optional colorant; and a lignosulfonate compound of the formula:

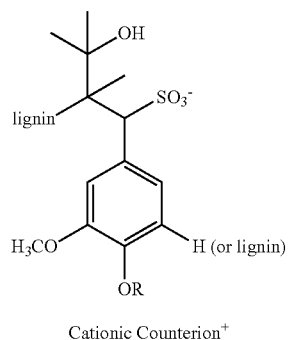

wherein R is hydrogen or
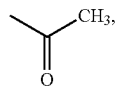
and
wherein the cationic counterion$^+$ is a nitrogen-alkyl cationic counterion, a nitrogen-aryl cationic counterion, a nitrogen-alkylaryl cationic counterion, or a nitrogen arylalkyl cationic counterion; and wherein the cationic counterion contains at least eight carbon atoms.
* * * * *